United States Patent
Mikulecky et al.

(10) Patent No.: US 11,905,422 B2
(45) Date of Patent: Feb. 20, 2024

(54) GLASS TEXTILE COATED WITH PARTIALLY SOLUBLE DEXTRIN-CONTAINING COATING

(71) Applicant: SAINT-GOBAIN ADFORS, Courbevoie (FR)

(72) Inventors: Bohuslav Mikulecky, Ústí nad Orlici (CZ); Lukáš Kulhavy, Nové Hrady (CZ); Matej Ceska, Policka (CZ)

(73) Assignee: SAINT-GOBAIN ADFORS, Courbevoie (FR)

( * ) Notice: Subject to any disclaimer, the term of this patent is extended or adjusted under 35 U.S.C. 154(b) by 519 days.

(21) Appl. No.: 17/276,841

(22) PCT Filed: Oct. 1, 2019

(86) PCT No.: PCT/EP2019/076517
§ 371 (c)(1),
(2) Date: Mar. 17, 2021

(87) PCT Pub. No.: WO2020/070096
PCT Pub. Date: Apr. 9, 2020

(65) Prior Publication Data
US 2021/0348013 A1 Nov. 11, 2021

(30) Foreign Application Priority Data
Oct. 2, 2018 (EP) .................... 18198145

(51) Int. Cl.
C09D 103/02 (2006.01)
C03C 25/321 (2018.01)
C09D 5/02 (2006.01)
D06N 3/00 (2006.01)
D06N 3/06 (2006.01)

(52) U.S. Cl.
CPC .......... C09D 103/02 (2013.01); C03C 25/321 (2013.01); C09D 5/022 (2013.01); D06N 3/0022 (2013.01); D06N 3/0061 (2013.01); D06N 3/06 (2013.01)

(58) Field of Classification Search
CPC .. C09D 103/02; D06N 3/0022; D04H 1/4218; D04H 1/587
See application file for complete search history.

(56) References Cited

U.S. PATENT DOCUMENTS

| 9,453,140 B2 | 9/2016 | Varagnat et al. |
| 2005/0215153 A1 | 9/2005 | Cossement et al. |

FOREIGN PATENT DOCUMENTS

FR 2982862 A1 5/2013

OTHER PUBLICATIONS

International Search Report dated Jan. 7, 2020 in PCT/EP2019/076517, 3 pages.
Written Opinion dated Jan. 7, 2020 in PCT/EP2019/076517, 5 pages.

Primary Examiner — Jeffrey C Mullis
(74) Attorney, Agent, or Firm — Element IP, PLC

(57) ABSTRACT

The invention is drawn to a method of coating a glass fiber textile comprising the following steps: —Preparing an aqueous coating composition comprising (a) 5 to 95% by weight, with respect to the total weight of (a) and (b), of a synthetic polymer or oligomer dissolved or dispersed in the aqueous coating composition, and (b) 5 to 95% by weight, with respect to the total weight of (a) and (b), of a dextrin exhibiting a weight-average molecular weight ranging from 250 000 to 2 000 000 Da and a solubility, measured according to a test A, ranging from 50 to 85%, —Applying said aqueous coating composition to a glass fiber textile, thereby obtaining a wet-coated glass fiber textile, —Submitting the wet-coated glass fiber textile to a step of drying and/or curing thereby obtaining a glass fiber textile coated with a water-insoluble polymer coating.

20 Claims, No Drawings

GLASS TEXTILE COATED WITH PARTIALLY SOLUBLE DEXTRIN-CONTAINING COATING

The present invention is drawn to a glass textile coated with a water-insoluble polymer coating comprising a partially water-soluble dextrin and to a coating method for producing such a coated textile. It is drawn in particular to glass fiber mesh fabrics, for use as reinforcement in External Thermal Insulation Complex Systems, in wall coverings or in dry wall tapes.

Glass fiber mesh fabrics are currently used in External Thermal Insulation Complex Systems (ETICS) to reinforce the render coating and facilitate application thereof to the underlying thermal insulation product (foam, glass wool, etc.). Such glass fiber mesh fabrics are generally coated with synthetic polymer coatings, typically SBR-based coatings, to provide the fabric with mechanical strength and to protect the glass fibers against the alkalinity of the render composition.

Such synthetic polymer coatings however are relatively expensive and do not meet the manufacturers' growing demand for green and more sustainable ingredients.

After extensive research the Applicant found that it was possible to replace part of the rather expensive synthetic polymer, typically a SBR latex, by a partially water-soluble dextrin dispersed and dissolved in the aqueous phase of the coating composition without significantly lowering the alkali resistance of the resulting coated glass textile.

The present invention is therefore drawn, in a first aspect, to a method of coating a glass fiber textile comprising the following steps:
Preparing an aqueous coating composition comprising
(a) 5 to 95% by weight, preferably 50 to 95% by weight, with respect to the total weight of (a) and (b), of a synthetic polymer or oligomer dissolved or dispersed in the aqueous coating composition, and
(b) 5 to 95% by weight, preferably 5 to 50% by weight, with respect to the total weight of (a) and (b), of a dextrin exhibiting a weight-average molecular weight ranging from 250 000 to 2 000 000 Da and a solubility, measured according to a test A, ranging from 50 to 85%,
Applying said aqueous coating composition to a glass fiber textile, thereby obtaining a wet-coated glass fiber textile,
Submitting the wet-coated glass fiber textile to a step of drying and/or curing thereby obtaining a glass fiber textile coated with a water-insoluble polymer coating.

In a second aspect, the present invention is drawn to a glass fiber textile coated with a water-insoluble polymer coating comprising an organic polymer matrix and preferably a particulate filler, wherein the organic polymer matrix comprises from 5 to 95% by weight, preferably from 50 to 95% by weight, of a thermoset or thermoplastic synthetic organic polymer and from 5 to 95% by weight, preferably from 5% to 50% by weight of a dextrin exhibiting a weight-average molecular weight ranging from 250 000 to 2 000 000 Da and a solubility, measured according to a test A, ranging from 50 to 85%, these percentages being expressed with respect to the total weight of synthetic polymer and dextrin.

The partially water-soluble dextrins used in the present invention are described in the international application WO2013/072639 which is incorporated herein by reference.

Their weight-average molecular weight (Mw) is determined by High Performance Size Exclusion Chromatography coupled on-line with Multiple Angle Laser Light Scattering (HPSEC-MALLS) according to the following protocol:
Preparation of a sample by dissolution of the dextrin by heating at 100° C. for 30 minutes in a dilution solvent (0.1 M $NaNO_3$ in DMSO), the concentration of the dextrin being comprised between 2 and 10 mg of dextrin per ml of dilution solvent,
Use of a High Performance Liquid Chromatography (HPLC) device equipped with a pump, operating in isocratic mode, which causes an elution solvent to circulate at 0.3 ml/min, with a refractometer, with a Laser Multiple Angle Light Scattering detector having 18 angles, which is heated at 35° C., for example a DAWN DSP detector from Wyatt, and with an oven for thermostatic control of the columns heated at 35° C., for example equipped with Suprema columns comprising polyhydroxymethacrylate copolymer networks for which the elution solvent is a 0.1 M aqueous sodium nitrate solution comprising 0.02 by weight of sodium azide,
Injection into the device of approximately 100 μl of the sample.

The weight-average molecular weight (Mw) and number-average molecular weight (Mn) can be determined from the resulting spectra for example by reprocessing the spectra as exponential $1^{st}$ order, using Astra v.4 analytical software.

The solubility of the dextrin is measured according to a test A which is as follows:
Taking a test sample of approximately 5.0 g (sample weight) of dextrin, said weight being expressed as dry weight,
Dispersing the test sample in 200 ml of water at 22° C. in an Erlenmeyer flask which is then kept at 22° C. in a water bath for 4 hours under stirring for 5 minutes every 30 minutes by means of a magnetic stirrer,
Filtering the contents of the Erlenmeyer flask through a filter paper with a porosity of 8 μm, for example Whatman filter (grade 2V),
Pipetting 50 ml of filtrate and introducing this amount into a dry and tared crystallization dish,
Evaporating the water from the crystallization dish by heating at 60° C. for 45 minutes and then at 130° C. for 90 minutes,
After cooling in a desiccator, weighing the dextrin obtained (solids extract weight),
The solubility (%) is calculated as follows Solubility (%)=400×solids extract weight/sample weight.

The dry weight of the test sample is calculated according to ISO standard 1666:1996.

The partially water-soluble dextrin used in the present invention advantageously exhibits a polydispersity index (Mw/Mn) of greater than 5, preferably greater than 10 and still more preferably greater than 15.

Its number-average molecular weight is preferably greater than 20 000 Da, more preferably greater than 25 000.

Its weight-average molecular weight preferably is comprised between 380 000 and 1 400 000 Da.

The solubility of the dextrin, determined according to Test A described above, preferably ranges from 55 to 65%.

Such partially water-soluble dextrins, already used in the food industry and paper industry, can be purchased for example from Roquette Freres (France) under the name Stabilys® A053 and Stabilys® CWS-EXP (LAB4511).

The synthetic polymer or oligomer may be any synthetic thermoplastic or thermosetting polymer or thermosetting oligomer commonly used for glass textile coatings, which may be applied as a liquid composition, preferably an aqueous liquid composition (aqueous solution or dispersion), and which after application and drying and/or curing results in a substantially water-insoluble polymer coating completely enveloping the glass fibers.

Synthetic polymers can be selected for example from the group consisting of styrene-butadiene rubber (SBR), poly(vinyl chloride) (PVC), poly(vinylidene chloride) (PVDC), acrylic polymers, olefinic polymers, ethylene vinyl acetate copolymers (EVA), polyamides, acrylamides, vinyl esters, and mixtures thereof.

It is also possible to use, in combination with or instead of the synthetic polymer, a thermosetting formaldehyde-based resin preferably selected from melamine-formaldehyde resins, phenol-formaldehyde resins, urea-formaldehyde resins and combinations thereof. Such a thermosetting formaldehyde-based resin is added to the coating composition in the form of a non-cured aqueous solution of an oligomeric resin prepared by prepolymerisation of formaldehyde and phenol, melamine or urea. It is completely polymerized and cured in situ.

In a preferred embodiment, the synthetic polymer is a styrene-butadiene rubber (SBR), an acrylic polymer or a combination of PVDC and a formaldehyde-based resin such as described in the Applicant's international application WO 2015/000902. In a particular preferred embodiment, the synthetic polymer is a styrene-butadiene rubber.

The aqueous coating composition used in the coating method of the present invention preferably comprises a synthetic polymer latex selected from the group consisting of SBR latex and acrylic polymer latex.

The aqueous coating composition used in the present invention preferably comprises from 6% to 40% by weight, more preferably from 7 to 30% by weight and even more preferably from 8 to 15% by weight of said dextrin exhibiting a weight-average molecular weight ranging from 250 000 to 2 000 000 Da and a solubility, measured according to a test A, ranging from 50 to 85%, these percentages being expressed with respect to the total dry weight of synthetic polymer and/or oligomer and dextrin.

When the partially water-soluble dextrin is used in amounts above 40% by weight, or even above 50% by weight, with respect to the total dry weight of synthetic polymer or oligomer, the dried or cured coating may provide the resulting coated textile with too high stiffness.

A too high amount of partially water-soluble dextrin also generally results in less satisfying alkali resistance and water-resistance, which are essential for coated textiles that are to come into contact with aqueous or alkaline compositions, such as glass fiber mesh fabrics for use as reinforcement in External Thermal Insulation Complex Systems (ETICS).

The aqueous coating composition may further comprise a particulate filler dispersed therein, preferably in an amount of from 3 to 40% by weight, with respect to its total dry weight, of a particulate filler.

The particulate filler may be an organic filler such as PVC particles or native starch particles, or an inorganic filler for example a carbonate filler.

The polymer coating obtained after application of the aqueous coating composition to the glass textile and drying and/or curing of the wet-coated glass textile may thus comprise both native starch visible, under a microscope, as a particulate filler dispersed in an organic matrix, and a partially water-soluble dextrin incorporated into the synthetic organic polymer of the matrix.

The uncoated glass fiber textile used in the present invention may be any kind of textile made of glass fibers. It may be a woven, knitted or braided textile, a laid scrim or a non-woven veil or mat. The uncoated glass fiber textile however does not encompass mineral wool insulation products such as mineral wool batts or mineral wool mats.

The uncoated glass fiber textile preferably is a glass fiber mesh fabric, i.e. an open fabric made of glass fiber yarns. It may be any open glass fiber fabric currently used for the production of SBR-coated glass fiber mesh fabrics, typically a woven or knitted mesh fabric. Its specific weight is preferably comprised between 30 and 500 g/m$^2$, more preferably between 50 and 300 g/m$^2$, and most preferably between 100 and 170 g/m$^2$.

The size of the mesh openings is preferably comprised between 1 mm$^2$ and 15 cm$^2$.

The warp and weft tensile strength of the mesh fabric measured on stripes (5 cm×30 cm) is comprised between 400 N and 10 000 N (DIN EN ISO 13934).

The organic polymer coating may be applied to the uncoated glass fabric without any pretreatment. The uncoated glass fabric preferably does not comprise any organic or mineral binder holding the individual fibers together. This however does not exclude the presence of an organic sizing coated onto the individual fibers during manufacturing thereof in an amount of less than about 0.5% by weight.

The total amount of organic polymer coating may be expressed as the loss-on-ignition (LOI), measured according to EN ISO 1887, of the final polymer-coated fabric. The organic polymer coating generally comprises between 6 wt % and 25 wt %, preferably between 7 wt % and 15 wt %, and more preferably between 8 and 12 wt % of the final coated glass fiber mesh.

Application of the coating composition is preferably carried out by immersing the glass fabric to be coated in the aqueous coating composition described above, and then pressing the impregnated fabric between two press rolls to eliminate excess coating composition. Application could also be done for example by roll coating, screen coating, spray coating or curtain-coating.

Drying and/or curing of the wet-coated glass fiber mesh fabric may be obtained by heating at a temperature comprised between about 100° C. and 280° C. for a period of time comprised between about 30 seconds to 20 minutes.

The coating bath may further comprise any useful adjuvant currently used in the field of polymer coatings such as thickeners, buffers, dyes, organic or mineral pigments, UV-absorbers, brighteners, rheology modifiers, or alkali such as ammonia.

The resulting final dried or cured coated glass fiber textile preferably has a weight of 30 to 500 g/m$^2$, preferably 50 to 300 g/m$^2$, and more preferably 100 to 170 g/m$^2$.

EXAMPLES

The fiber mesh fabric for all examples was a standard glass fiber mesh fabric (Saint-Gobain Adfors) having a specific weight of 129.5 g/m$^2$ before coating.

This fabric was impregnated by immersion in an aqueous coating bath and then pressed between two rolls before being cured in an infra-red zone at a temperature of about 280° C.

The final coated mesh fabric has specific weight of 162 g/m$^2$, a dry pick up of about 20% and a LOI of about 17%.

The below tables show the composition of a coating bath according to the present invention (Table 1) and of a comparative coating bath containing no partially water-soluble dextrin (Table 2).

TABLE 1

|  | Wt % | Solids content | Wt % in dry coating |
|---|---|---|---|
| LITEX ® S9074 | 83 | 50 | 89.15 |
| STABILYS ® CWS-EXP | 5.6 | 90 | 10.85 |
| Water | 11.39 | 0 | 0 |

TABLE 2

|  | Wt % | Solids content | Wt % in dry coating |
|---|---|---|---|
| LITEX ® S9074 | 100 | 50 | 100 |

LITEX® S9074 (Synthomer) is an aqueous, anionic dispersion of a carboxylated self-crosslinking butadiene-styrene-methacrylate copolymer STABILYS® CWS-EXP (LAB4511) (Roquette Freres, France) is a partially water-soluble dextrin The alkali resistance of meshes according to the invention (Table 1) and comparative meshes (Table 2) were measured according to the ETAG-004 guidelines (edition 2011, point 5.6.7)

5 cm×30 cm samples were immerged during 28 days in an alkaline solution (1 g NaOH, 4 gKOH, 0.5 g Ca(OH)$_2$ per liter) at 23° C. After 28 days, the alkaline solution is replaced by an identical volume of an acidic solution (0.05% HCl). After 5 minutes of neutralization, the samples are washed three times with water and dried for 48 hours at 23° C. and 50% RH.

Tearing strength was measured for two samples before and after ageing and tearing strength retention was calculated.

TABLE 3

| R131 | Initial tearing strength (N/5 cm) | Tearing strength after alkaline ageing (N/5 cm) | Tearing strength retention (%) |
|---|---|---|---|
| Coated mesh according to invention | 2427/2258 | 1730/1711 | 71/76 |
| Comparative coated mesh | 2380/2319 | 1666/1507 | 70/65 |

To be used as reinforcement in ETICS a coated mesh must have a tearing strength of at least 1000 N/5 cm and tearing strength retention of at least 50% after the ETAG 004 alkaline ageing.

Table 3 shows that the coated glass fiber meshes comprising about 10 wt % of partially water-soluble dextrin and 60 wt % of SBR have performances that are comparable to, and even slightly better than those of a comparative glass fiber mesh coated with 70% by weight of SBR.

The invention claimed is:

1. A method of coating a glass fiber textile, the method comprising:
    applying an aqueous coating composition to a glass fiber textile, to obtain a wet-coated glass fiber textile; and
    drying and/or curing the wet-coated glass fiber textile, to obtain a glass fiber textile coated with a water-insoluble polymer coating,
    wherein the aqueous coating composition comprises:
    (a) 5 to 95% by weight, with respect to a total weight of (a) and (b), of a synthetic polymer and/or synthetic oligomer dissolved or dispersed in the aqueous coating composition; and
    (b) 5 to 95% by weight, with respect to the total weight of (a) and (b), of a dextrin exhibiting a weight-average molecular weight ranging from 250 000 to 2 000 000 Da and a solubility, measured according to a test A, ranging from 50 to 85%.

2. The method according to claim 1, wherein the aqueous coating composition further comprises from 3 to 40% by weight (dry weight) of a particulate filler dispersed in the aqueous coating composition.

3. The method according to claim 1, wherein the solubility of the dextrin, measured according to test A, ranges from 55 to 65%.

4. The method according to claim 1, wherein the aqueous coating composition comprises a synthetic polymer selected from the group consisting of styrene-butadiene rubber (SBR), poly(vinyl chloride) (PVC), poly(vinylidene chloride) (PVDC), an acrylic polymer, an olefinic polymer, an ethylene vinyl acetate copolymer (EVA), a polyamide, an acrylamide, a vinyl ester, and mixtures thereof.

5. The method according to claim 1, wherein the aqueous coating composition comprises a synthetic polymer latex selected from the group consisting of SBR latex and acrylic polymer latex.

6. The method according to claim 1 wherein the aqueous coating composition comprises at least one synthetic oligomer selected from the group consisting of a phenol-formaldehyde resin, a urea-formaldehyde resin, and a melamine-formaldehyde resin.

7. The method according to claim 1, wherein the aqueous coating composition comprises from 6% to 40% by weight of said dextrin, these percentages being expressed with respect to the total weight of the synthetic polymer and/or the synthetic oligomer and the dextrin.

8. The method according to claim 1, wherein the glass fiber textile is a glass fiber mesh fabric.

9. A glass fiber textile coated with a water-insoluble polymer coating, said water-insoluble coating comprising an organic polymer matrix and optionally a particulate filler,
    wherein the organic polymer matrix comprises from 5% to 95% by weight of a synthetic organic polymer, and from 5% to 95 by weight of dextrin exhibiting a weight-average molecular weight ranging from 250 000 to 2 000 000 Da and a solubility, measured according to a test A, ranging from 50 to 85%, these percentages being expressed with respect to the total weight of the synthetic polymer and the dextrin.

10. The glass fiber textile according to claim 9, wherein the solubility of the dextrin, measured according to test A, ranges from 55 to 65%.

11. The glass fiber textile according to claim 9, wherein the synthetic polymer is selected from the group consisting of styrene-butadiene rubber (SBR), poly(vinyl chloride) (PVC), poly(vinylidene chloride) (PVDC), an acrylic polymer, an olefinic polymer, an ethylene vinyl acetate copolymer (EVA), a cross-linked phenol-formaldehyde resin, a cross-linked urea-formaldehyde resin, a cross-linked melamine-formaldehyde resin, a polyamide, an acrylamide, a vinyl ester, and mixtures thereof.

12. The glass fiber textile according to claim 10, wherein the synthetic polymer is SBR or acrylic polymer or a mixture thereof.

13. The glass fiber textile according to claim 9, wherein the organic polymer matrix comprises from 6% to 30% by weight of the dextrin, these percentages being expressed with respect to the total weight of the synthetic polymer and the dextrin.

14. The glass fiber textile according to claim 9, wherein the polymer coating comprises the particulate filler in an amount from 3% to 40% by weight (dry weight).

15. The glass fiber textile according to claim 9, wherein the glass fiber textile is a glass fiber mesh fabric.

16. The method according to claim 1, wherein the aqueous coating composition comprises 50 to 95% by weight of the synthetic polymer or the synthetic oligomer and 5 to 50% by weight of the dextrin, these percentages being expressed with respect to the total weight of the synthetic polymer and/or the synthetic oligomer and the dextrin.

17. The method according to claim 16, wherein the aqueous coating composition comprises from 7 to 30% by weight of said dextrin, based on the total weight of the synthetic polymer and/or the synthetic oligomer and the dextrin.

18. The method according to claim 16, wherein the aqueous coating composition comprises from 8 to 15% by weight of said dextrin, based on the total weight of the synthetic polymer and/or the synthetic oligomer and the dextrin.

19. The glass fiber textile according to claim 9, wherein the organic polymer matrix comprises from 50% to 95% by weight of the synthetic organic polymer and from 5% to 50 by weight of the dextrin, these percentages being expressed with respect to the total weight of the synthetic polymer and the dextrin.

20. The glass fiber textile according to claim 19, wherein the organic polymer matrix comprises from 7 to 20% by weight of the dextrin, based on the total weight of the synthetic polymer and the dextrin.

* * * * *